Patented Feb. 18, 1947

2,416,233

UNITED STATES PATENT OFFICE 2,416,233

THERAPEUTICALLY ACTIVE SUBSTITUTED NITROFURANS OF THE IMINO SERIES

William B. Stillman and Albert B. Scott, Norwich, N. Y., assignors, by mesne assignments, to Eaton Laboratories, Inc., Norwich, N. Y., a corporation of New York No Drawing. Application May 17, 1944, Serial No. 536,049

7 Claims. (Cl. 260—345)

The present application is in part a continuation of copending application filed May 17, 1944, Serial No. 536,047, filed on even date herewith.

The present invention relates to compounds of therapeutic interest. These compounds inhibit or prevent the growth of bacteria and comprise many which show therapeutic activity in the animal body. The compounds do not contain toxic heavy metals, phenolic hydroxyl groups or halogens. They are relatively non-corrosive, non-irritant and non-toxic.

The invention is based on the discovery that the presence of the nitrofuran grouping

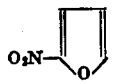

in association with variations of the side chain grouping

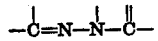

produces compounds which are effective against bacteria and many of which are active against infections in the animal body.

It has been found that outstanding antiseptic activity and also chemotherapeutic activity can be obtained from furan compounds which contain a nitro-group in the α-position, i. e. in the 2- or 5- position in the furan ring, and which are substituted in at least one of the remaining α(2 or 5) and β positions as follows:

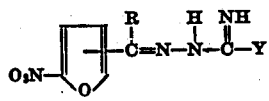

wherein R represents hydrogen, alkyl or substituted alkyl, for example hydroxyalkyl, and Y represents alkyl, substituted alkyl such as hydroxyalkyl, alkoxy, amido, alkylamido, carbamido, carboxyalkyl or guanido.

The aforedescribed compounds may be prepared by condensing the aldehyde, 5-nitro furfural

or the corresponding ketone

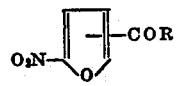

(R having the above-indicated significance) with any one of a wide variety of compounds possessing a reactive amino group. The reactive amino compounds are so chosen that they will lead to the chemotherapeutically active configuration.

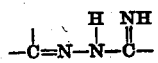

The scope of the invention thus includes all amino compounds which will lead to a side chain of this configuration.

Thus the condensation may be carried out between 5-nitro-2-furfural and, for example, one of the following reactive compounds: aminoguanidine, aminoguanidine sulfate, nitroaminoguanidine, α-methyl-γ-aminoguanidine hydroiodide, α-ethyl-γ-aminoguanidine hydroiodide, α-n-butyl-γ-aminoguanidine hydroiodide, etc. Alternatively, 5-nitro-2-furyl methyl ketone may for example be condensed with these or similar amino compounds. The reactive amino compounds may be employed as such or in the form of their acid salts or alkali metal compounds or in any combination which will release the free amine under reaction conditions similar to those described in the following illustrative examples of condensations.

EXAMPLE I 5-nitro-2-furfurylideneaminoguanidine sulfate

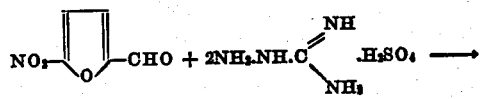

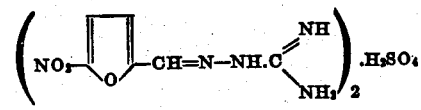

Aminoguanidine sulfate (5 g.) was dissolved in water (100 cc.). 5-nitro-2-furfural (5 g.) was added to the solution of aminoguanidine sulfate and the mixture was warmed for five minutes on the steam bath. The flask was then removed from the steam bath and swirled by hand until a precipitate formed. This required from ten to fifteen minutes. The flask was then cooled in the refrigerator, after which the precipitate was removed by filtration. The product was recrystallized three times from water, using Darco (8.5 g. of crude material per 300 cc. of water). The purified material was a pale yellow color. It had no melting point, but charred and burned in a flame. It was the sulfate salt. The weight of purified material was 5.5 g. (65% yield). Solubility 1:750.

Example II

*5-nitrofurfurylideneaminonitroguanidine*

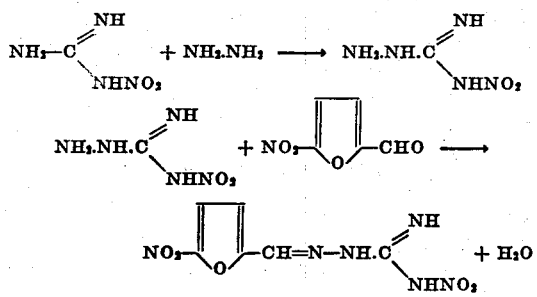

Nitroaminoguanidine was prepared from nitroguanidine and hydrazine according to the procedure of Phillips and Williams, Jour. Am. Chem. Soc. 50, 2465 (1928). Then the nitroaminoguanidine was condensed with 5-nitrofurfural in aqueous solution essentially as described for the preparation of 5-nitrofurfurylideneaminoguanidine salts, to produce the 5-nitrofurfurylideneaminonitroguanidine.

Example III

*5-nitrofurfurylidene-γ-amino-α-methylguanidine hydroiodide*

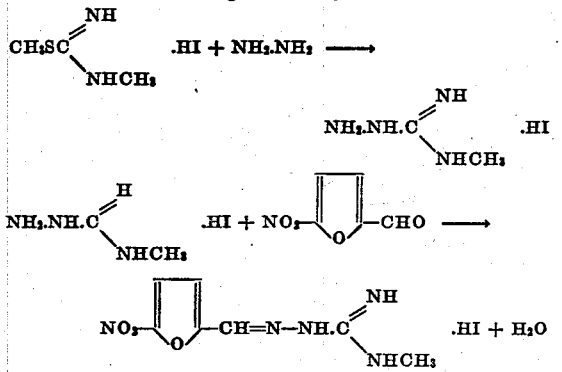

α-Methyl-γ-aminoguanidine hydroiodide was prepared from S-methyl N-methyl isothiourea and hydrazine according to the procedure of Kirsten and Smith, Jour. Am. Chem. Soc. 58, 800 (1936). The α-methyl-γ-aminoguanidine hydroiodide was then condensed with 5-nitrofurfural essentially as described for the preparation of 5-nitrofurfurylideneaminoguanidine sulfate. Alternatively, the sulfate salt could be employed in place of the hydroiodide. The 5-nitrofurfurylidene-γ-amino-α-methylguanidine hydroiodide or sulfate, respectively results.

Example IV

*5-nitrofurfurylidene-γ-amino-α-ethyl guanidine hydroiodide*

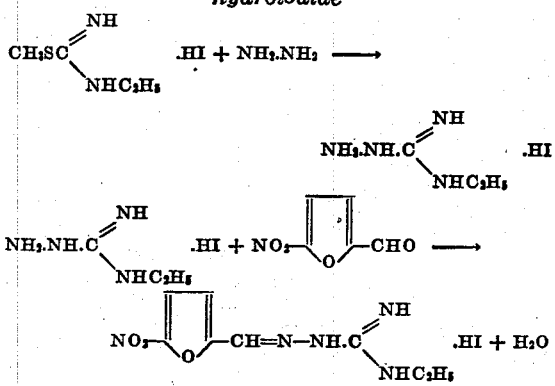

α-Ethyl-γ-aminoguanidine hydroiodide was prepared from S-methyl N-ethyl isothiourea hydroiodide and hydrazine according to the procedure of Kirsten and Smith, Jour. Am. Chem. Soc. 58, 800 (1936). The α-ethyl-γ-aminoguanidine hydroiodide was then condensed with 5-nitrofurfural in a manner essentially as described for the preparation of 5-nitrofurfurylideneaminoguanidine sulfate, producing the 5-nitrofurfurylidene-γ-amino-α-ethyl guanidine hydroiodide.

Example V

*5-nitrofurfurylidene-γ-amino-α-n-butyl guanidine hydroiodide*

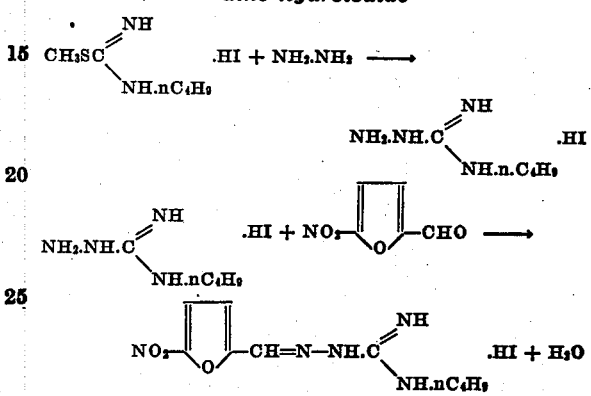

α-n-Butyl-γ-aminoguanidine hydroiodide was prepared from S-methyl N-ethyl isothiourea hydroiodide and hydrazine according to the procedure of Kirsten and Smith, Jour. Am. Chem. Soc. 58, 800 (1936). The α-n-butyl-γ-aminoguanidine hydroiodide was then condensed with 5-nitrofurfural essentially as described for the preparation of 5-nitrofurfurylidene aminoguanidine sulfate, to produce the 5-nitrofurfurylidene-γ-amino-α-n-butyl guanidine hydroiodide.

The compounds according to the present invention can be used locally against bacterial infections. For this purpose they can be employed as solutions, emulsions or ointments. Also, some of these compounds have been found to be effective in animals, when administered orally, against fatal infections obtained by inoculation with streptococci and trypanosomes.

Having thus disclosed the invention, what is claimed is:

1. A new chemical compound having chemotherapeutic activity and represented by the formula:

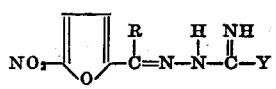

in which R represents a member of the group consisting of hydrogen, alkyl and hydroxyalkyl, and Y represents a member of the group consisting of amido, alkylamido, nitroamido, carbamido and guanido, and the salts thereof.

2. 5-nitrofurfurylidene aminoguanidine represented by the formula:

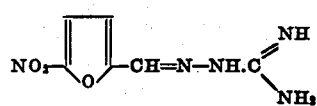

3. A salt of the compound claimed in the next preceding claim.

4. 5-nitro-2-furfurylideneaminoguanidine sulfate represented by the formula:

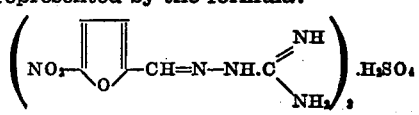

5. 5 - nitrofurfurylideneaminonitroguanidine represented by the formula:

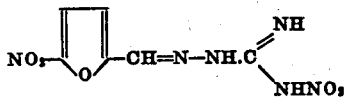

6. 5- nitrofurfurylidene - γ - amino - α - methylguanidine represented by the formula:

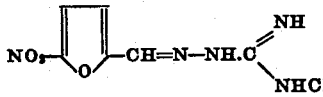

7. A salt of the compound claimed in the next preceding claim.

WILLIAM B. STILLMAN.
ALBERT B. SCOTT.

REFERENCES CITED

The following references are of record in the file of this patent:

UNITED STATES PATENTS

| Number | Name | Date |
|---|---|---|
| 2,261,735 | Gertler et al. | Nov. 4, 1941 |
| 2,310,004 | Widmer et al. | Feb. 2, 1943 |
| 1,780,636 | Stine | Nov. 4, 1930 |

OTHER REFERENCES

Heilbron, Dictionary of Organic Compounds, vol. III (1938), page 151. (Copy in Division 59.)
Beilstein, Band III, 4th ed., 1921, page 118. (Copy in Div. 6.)